Oct. 23, 1962 B. J. SCHEBLER 3,060,359
TWO BRIDGE REPEATER SERVOSYSTEM
Filed Sept. 25, 1958
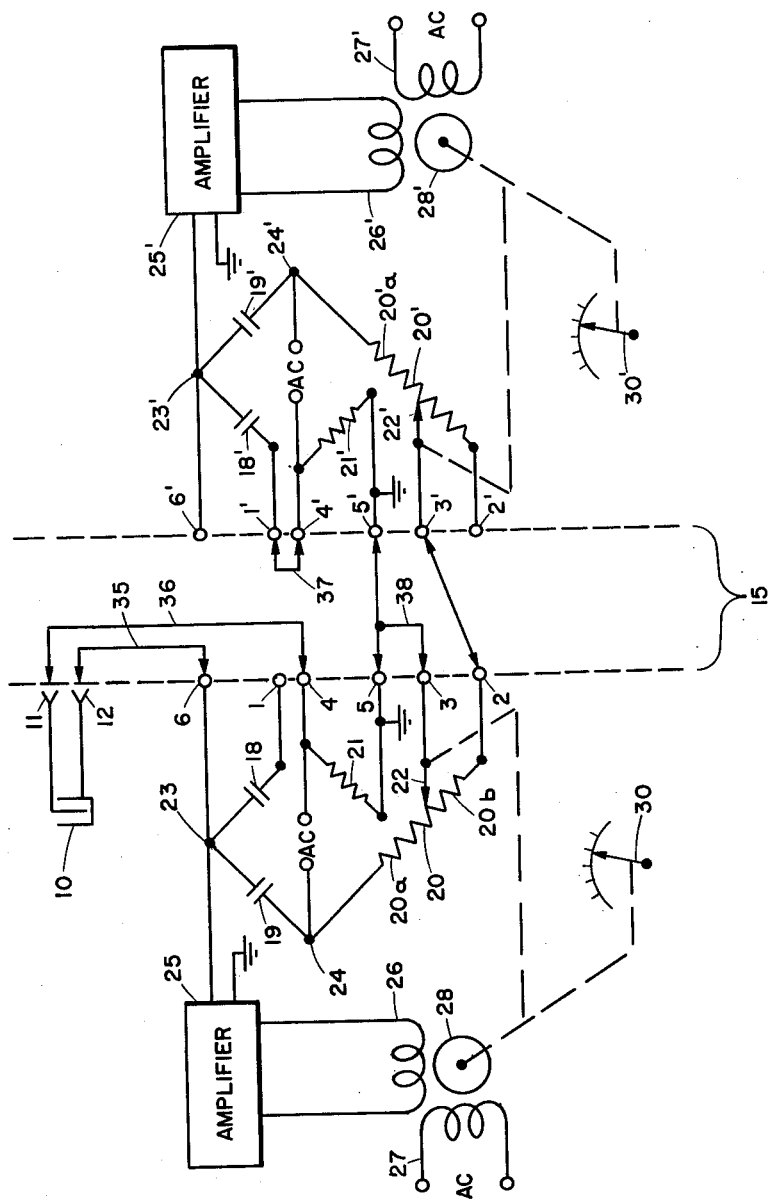
INVENTOR.
BERNARD J. SCHEBLER
BY
ATTORNEY United States Patent Office 3,060,359
Patented Oct. 23, 1962

3,060,359
TWO BRIDGE REPEATER SERVOSYSTEM
Bernard J. Schebler, Davenport, Iowa, assignor to The Bendix Corporation, a corporation of Delaware
Filed Sept. 25, 1958, Ser. No. 763,314
5 Claims. (Cl. 318—19)

This invention relates to improvements in master and repeater systems and bridge circuits therefor.

One object of the invention is to provide servo master and servo repeater system arrangements in which the master and repeater or slave units are completely interchangeable.

When a condition responsive master unit, such, for example, as an indicator, must operate with a high degree of accuracy for long periods, it is common to employ servo systems in which the master's output or indication is compared with the variable whose condition is to determine the output or indication and a signal proportional to their difference is applied to correct the master output or indication until the difference is overcome. When a second, similar ouput or indication is required, and because of the remoteness or other characteristics of the apparatus which senses the condition of the variable, it is not practical to duplicate the master, a repeater or slave unit is employed. The repeater is operated by a signal taken from the master and when a high degree of accuracy is required in the repeater, it too must comprise a servo system.

Such systems are costly and when, as in the part, the master and repeater servos are not interchangeable the cost of replacement units and their storage may be very great. For example, various aircraft have incorporated both a servo type fuel quantity indicator and a servo repeater and it was necessary to stock spare indicators and repeaters at air bases around the globe. Applied to these devices, the invention makes it possible for a single unit to serve either as the indicator or the repeater whereby the number of spare units required, and initial and storage costs are greatly reduced.

Another object of the invention is the provision of a system in which these advantages are realized without loss of accuracy and without increasing complexity in the system.

While applicable to master-repeater systems generally, the invention is especially advantageous in connection with fuel quantity gaging. An object of the invention is to provide an improved system for this purpose and an embodiment of the invention thus applied is illustrated diagrammatically in the accompanying drawing, it being understood that various modifications may be made in the embodiment illustrated and that other embodiments are possible without departing from the spirit of the invention or the scope of the appended claims.

Certain of the foregoing objects are realized by the provision of a novel bridge arrangement in which one leg includes a three terminal variable impedor. The impedance between two of these terminals is included in the bridge when the bridge is employed in the master. The remaining portion of the impedor is included in a second repeater bridge.

Referring to the drawing, there is shown a capacitive liquid level probe 10, of any well known type, having its elements connected to a pair of connectors 11 and 12. The numeral 15 designates connecting means, such as a wiring harness, including the several connecting circuits which appear between the dashed lines in the drawing. At the right and left of connecting means 15 are a servo repeater and servo indicator, respectively. These are alike, their function as repeater or indicator being determined by connections made in connecting means 15.

The indicator comprises: six terminals numbered 1 through 6; a first impedor 18 and a second impedor 19, both of which are advantageously capacitors, as shown in the embodiment selected for illustration, and the portion between two terminals of a three terminal impedor 20 connected in series in that order between terminals 1 and 2. These elements comprise three legs of a four-legged bridge whose fourth leg comprises the impedor 21. While other impedors may be employed, advantageously both of impedors 20 and 21 comprise resistors, as shown. Resistor 21 is connected between terminals 4 and 5. Resistor 20 has a tap 22 connected to terminal 3. The sixth terminal is connected to the junction 23 intermediate capacitors 18 and 19.

The bridge is energized by alternating current applied between terminal 4 and the junction 24 between capacitor 19 and resistor 20. The bridge output voltage which appears between junction 23 and the grounded terminal 5 is applied to the input circuit of an amplifier 25.

The amplifier output is applied to a winding 26 of a two-winding motor whose other winding 27 is connected across an alternating electrical power source. The motor rotor 28 rotates in accordance with the energization of windings 26 and 27, and, having mechanical connection to an indicator 30 and the tap 22, positions the indicator pointer and tap 22.

Corresponding elements of the repeater and indicator have been designated by like numerals in the drawing except for the addition of prime signs to designate the repeater elements.

Applied to the bridge circuit selected for illustration, it is a feature of the invention that the opposed bridge legs including capacitor 18 and resistor 20 are not completed but connections to these legs are brought to terminals for connection in harness 15. The harness includes conductors 35 and 36 by which the probe terminals 11 and 12 are connected to terminals 6 and 4. Fixed capacitor 18 is not used except for calibrating the bridge; but fixed capacitor 18' is connected in the repeater bridge by a jumper 37 across terminals 1' and 4'. The connection from terminal 3 to terminal 5 is completed by a jumper 38 to connect tap 22 to resistor 21. The unused portion of resistor 22 is connected between tap 22' and resistor 21' by a conductor 39 extending from jumper 38 to terminal 5' and a conductor connecting terminals 2 and 3'.

In operation of the system thus connected, a decrease in the liquid level to be sensed diminishes the capacitance of probe 10. Because the probe is connected in one leg of the indicator bridge, the bridge is unbalanced and a voltage appears at the input of indicator amplifier 25 resulting in energization of motor winding 26. Rotor 28 revolves moving the indicator pointer toward a reduced level mark and the resistor tap 22 in a direction toward junction 24 reducing the portion 20a of the resistor which is included in the indicator bridge until the bridge is rebalanced.

The portion 20b of resistor 20 is thus increased. This portion is connected in series with portion 20'a of resistor 20' in the leg of the repeater bridge opposite the leg containing fixed capacitor 18'. Thus the repeater bridge is unbalanced and its amplifier 25' is energized to energize motor winding 26'. Accordingly, rotor 28' is turned to move the pointer of indicator 30 toward a lower level indication and a tap 22 is moved toward junction 24' until the bridge is rebalanced.

The indicator and repeater units may be inter-changed without any other circuit change, and the circuitry and operation will be unchanged.

While the invention has been described, and is advantageously employed, in measuring liquid level, it may be employed in other applications.

I claim:

1. A servo bridge unit arranged for sensing a condition in terms of electrical condition and for reproducing the electrical condition of a similar bridge interchangeably, comprising; at least six electrical connection terminals; a first impedor, a second impedor, and a resistor connected in series between a first and second one of said terminals; an adjustable tap on said resistor connected to a third one of said terminals; a third impedor connected between a fourth and a fifth one of said terminals, a connection from the sixth one of said terminals to the junction between said first and second impedors; and means for connecting an electrical power source between said fourth terminal and the junction between said second impedor and said resistor.

2. An indicator and repeater servo system comprising; a first bridge unit including at least six terminals; a first impedor, a second impedor, and a resistor connected in series between a first and second one of said terminals; an adjustable tap on said resistor connected to a third one of said terminals; a third impedor connected between a fourth and a fifth one of said terminals, a connection from the sixth one of said terminals to the junction between said first and second impedors; and means for connecting an electrical power source between said fourth terminal and the junction between said second impedor and said resistor; a second bridge unit like said first bridge unit; an impedor variable with the condition to be indicated; and an interconnecting cable comprising, means for interconnecting the first and fourth terminals of one of said units, means for interconnecting the fifth terminal of said one unit with the third and fifth terminals of the other of said units, means for interconnecting the third terminal of said one unit with the second terminal of said other unit, and means for connecting said variable impedor across the fourth and sixth terminals of said other unit.

3. For a servo system, in combination, a master electrical bridge and a repeater electrical bridge, each having in one of its legs that portion between one end and the intermediate terminal of a respectively associated one of a pair of three terminal impedors of the type whose intermediate terminal is an adjustable tap, said bridges being alike electrically except that the impedance in another leg of the master bridge is variable in accordance with a condition whereas the corresponding leg of the repeater bridge is not and except that the portion between the intermediate terminal and the other end of the three terminal impedor of said master bridge is included in series circuit in said one leg of the repeater bridge.

4. The invention defined in claim 3 including first and second electrical motors having a driving connection to the intermediate terminal of the three terminal impedors of said master and repeater bridge respectively, and means for applying the unbalance voltage of said master and repeater bridges to drive said first and second motors respectively.

5. The invention defined in claim 3 in which said impedance variable in accordance with a condition is a level gaging capacitor unit.

References Cited in the file of this patent

UNITED STATES PATENTS

| | | |
|---|---|---|
| 2,111,442 | West | Mar. 15, 1938 |
| 2,482,196 | Marye | Sept. 20, 1949 |
| 2,667,608 | Siderman | Jan. 26, 1954 |
| 2,684,473 | Shannon | July 20, 1954 |
| 2,747,149 | Azgapetian et al. | May 22, 1956 |
| 2,794,971 | Hornfeck | June 4, 1957 |
| 2,812,481 | Roosdorp | Nov. 5, 1957 |

OTHER REFERENCES

International Dictionary of Physics and Electronics, D. Van Nostrand Co., 1956.